(12) United States Patent
Schaefer et al.

(10) Patent No.: US 11,165,499 B2
(45) Date of Patent: Nov. 2, 2021

(54) APPARATUSES, METHODS, AND COMPUTER PROGRAMS FOR A REMOTE UNIT AND A CENTRAL UNIT OF AN OPTICAL LINE TERMINAL

(71) Applicant: Intel Corporation, Santa Clara, CA (US)

(72) Inventors: Franz Josef Schaefer, Oberhaching (DE); Guy Ray, Kiryal Ono M (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/929,833

(22) Filed: May 26, 2020

(65) Prior Publication Data

US 2021/0099231 A1 Apr. 1, 2021

(30) Foreign Application Priority Data

Sep. 27, 2019 (DE) ..................... 10 2019 126 173.2

(51) Int. Cl.
 *H04B 10/27* (2013.01)
(52) U.S. Cl.
 CPC ................................... *H04B 10/27* (2013.01)
(58) Field of Classification Search
 CPC ..................................................... H04B 10/27
 USPC ......................................................... 398/58
 See application file for complete search history.

(56) References Cited

U.S. PATENT DOCUMENTS 8,938,167 B2 * 1/2015 Yoo .................... H04Q 11/0067
 398/38

| | | | |
|---|---|---|---|
| 2002/0027682 A1* | 3/2002 | Iwasaki | H04Q 11/0062 398/9 |
| 2004/0146301 A1 | 7/2004 | Choi, II et al. | |
| 2006/0104370 A1* | 5/2006 | Yamanaka | H04L 1/0009 375/242 |
| 2007/0064731 A1* | 3/2007 | Mizutani | H04L 47/15 370/468 |
| 2011/0085799 A1* | 4/2011 | Mizutani | H04Q 11/0067 398/37 |

(Continued)

OTHER PUBLICATIONS

Edward Boyd et al: "Remote Pon Network Performance", Proceedings Spring Technical Forum, May 5, 2015-May 7, 2015, XP055747658, Chicago.

*Primary Examiner* — Dalzid E Singh
(74) *Attorney, Agent, or Firm* — 2SPL Patent Attorneys PartG mbB; Kieran O'Leary

(57) ABSTRACT

Examples relate to apparatuses, methods, and computer programs for a remote unit and a central unit of an optical line terminal. In particular, a central unit apparatus for an optical line terminal comprises one or more interfaces configured to communicate with one or more remote unit apparatuses via one or more communication links. The apparatus further comprises a processor configured to receive information on one or more upstream reports from the remote unit apparatuses, the upstream reports relate to one or more optical networks used by the remote unit apparatuses to communicate with a plurality of optical network users. The processor further determines information on bandwidth assignments for the plurality of optical network users based on the information on the one or more upstream reports and transmits the information on bandwidth assignments to the one or more remote unit apparatuses.

15 Claims, 4 Drawing Sheets

(56) References Cited

U.S. PATENT DOCUMENTS

| | | | |
|---|---|---|---|
| 2012/0321312 A1 | 12/2012 | Timm et al. | |
| 2015/0208347 A1* | 7/2015 | Iiyama | H04L 12/44 370/311 |
| 2019/0327541 A1* | 10/2019 | Zhang | H04Q 11/00 |
| 2020/0014992 A1* | 1/2020 | Chung | H04J 14/08 |

* cited by examiner

APPARATUSES, METHODS, AND COMPUTER PROGRAMS FOR A REMOTE UNIT AND A CENTRAL UNIT OF AN OPTICAL LINE TERMINAL

CROSS-REFERENCE TO A RELATED APPLICATION

This application claims priority under 35 U.S.C. § 119(a) to German Application No. 10 2019 126 173.2 filed on Sep. 27, 2019. The contents of the earlier filed application are incorporated by reference herein in their entirety.

FIELD

Examples generally relate to network communications technology. In particular, examples relate to apparatuses, methods, and computer programs for a remote unit and a central unit of an optical line terminal. More particularly, but not exclusively, examples relate to the provision of layered dynamic bandwidth assignments within access multiplexers.

BACKGROUND

An access network is typically controlled by an access multiplexer where the data rate or bandwidth on the multiplexer's uplink (i.e. network-facing) interface is typically lower than the sum of the bandwidth of its downlink (i.e. subscriber-facing) interfaces. This is possible because of two effects. First, in the downstream direction, a significant portion the traffic is multicast, meaning that one packet received by the access multiplexer via its uplink interface is forwarded to a plurality of network users via its downlink interfaces. Second, in the upstream direction, network users behave independently from one another and usually do not request their full bandwidth at the same time.

These two effects allow for the uplink and shared downlink connections to be oversubscribed. The access multiplexer performs dynamic bandwidth allocation (DBA) to flexibly assign bandwidth based on the instantaneous need reported by each network user. DBA becomes more effective as network users are aggregated. However, the aggregation of all network users to a traditional access multiplexer leads to problems of complexity, expense, and power-consumption. Hence, there may be a desire for an improved access multiplexer architecture.

BRIEF DESCRIPTION OF THE FIGURES

Some examples of apparatuses, methods, and/or computer programs will be described in the following only by way of example and with reference to the accompanying figures, in which.

DETAILED DESCRIPTION

Figure 1:
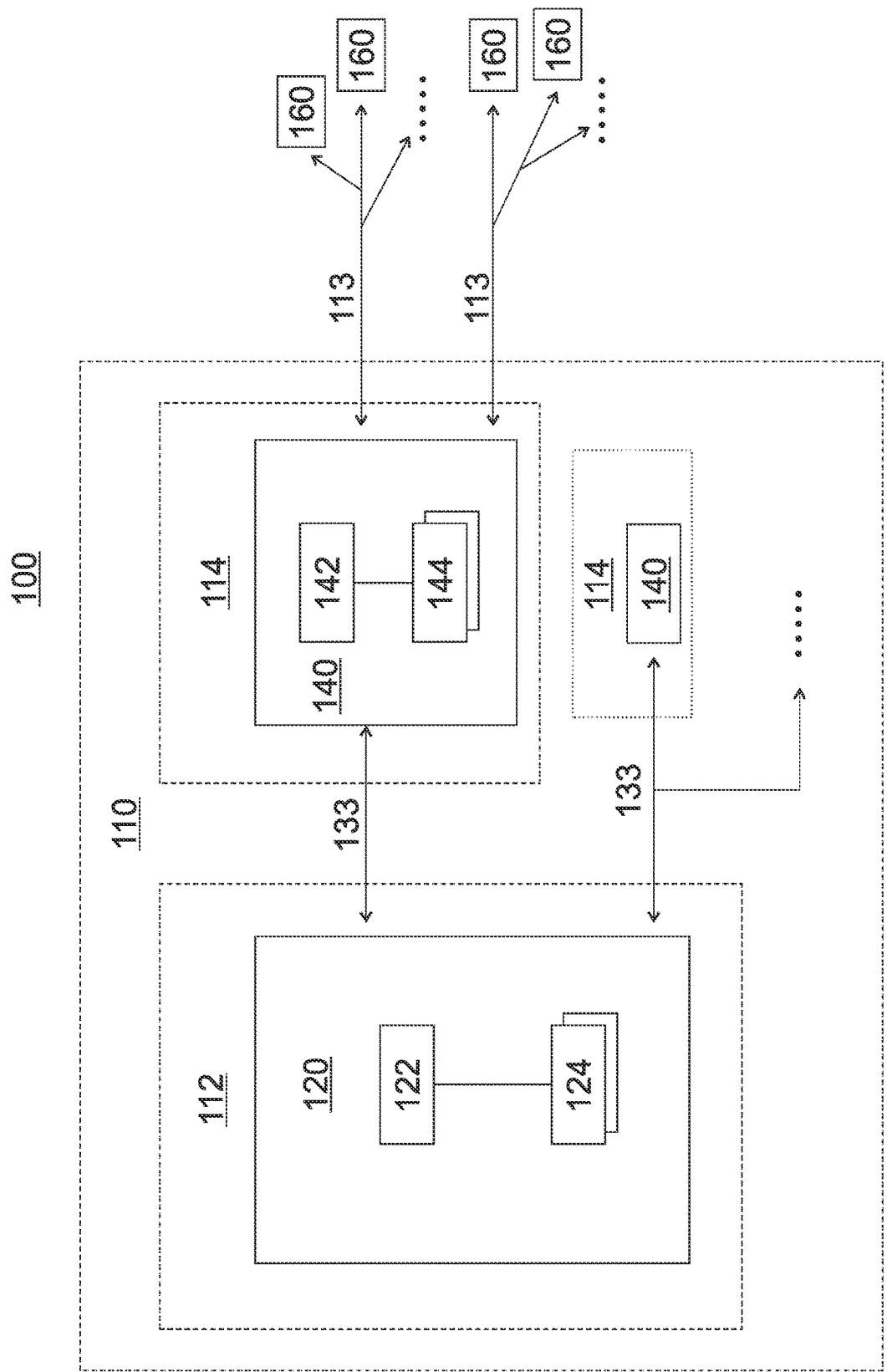
FIG. 1 shows a schematic overview of the elements of a communications network including examples of a central unit apparatus, a remote unit apparatus, a central unit, a remote unit, and an optical line terminal.

Various examples will now be described more fully with reference to the accompanying drawings in which some examples are illustrated. The thicknesses of lines, layers, and/or regions in the figures may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations (i.e. only A, only B, as well as A and B) if not explicitly or implicitly defined otherwise. An alternative wording for the same combinations is "at least one of A and B" or "A and/or B". The same applies, mutatis mutandis, for combinations of more than two elements.

The terminology used herein for the purpose of describing particular examples is not intended to be limiting for further examples. Whenever a singular form such as "a," "an" and "the" is used, and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used specify the presence of the stated features, integers, steps, operations, processes, acts, elements, and/or components but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

In access networks, a subscriber line (i.e. "last mile") is typically controlled by access multiplexers. Examples are a Digital Subscriber Line (DSL) Access Multiplexer (DSLAM) for Very High Speed Digital Subscriber Line (VDSL) or Fast Access to Subscriber Terminals (G.FAST) loops. In cable networks, a Cable Modem Termination System (CMTS) in case of Data Over Cable Service Interface Specification (DOCSIS) assumes the role of an access multiplexer. In optical networks, an optical line terminal (OLT) in case of passive optical networks (PONs) may conduct access multiplexing. In the DSL case, DSLAMs aggregate a large amount of individual subscriber lines, whereas for DOCSIS and PON, the CMTS or OLT terminates a number of shared media, each of which may be connected to a few dozen subscribers. This allows very high subscriber counts to be serviced, easily more than 1000 subscribers in a single 19" shelf or rack-mounted system.

The data rate or bandwidth on the access multiplexer's uplink interface may be typically lower than the sum of the data rates of its downlink interfaces. This is possible because of two side conditions or effects typically seen in access networks:

First, in the downstream direction, a significant portion of the traffic is multicast traffic (i.e. the same data is addressed to multiple users). The access multiplexer may then receive only one copy of a multicast packet but forwards many copies. Second, in the upstream direction, not all network users will utilize their full upstream data rate at the same time.

This allows the access network to be oversubscribed. This oversubscription exploits the circumstance that network users usually behave statistically independent of one another. Statistical multiplexing works better the more network users the oversubscribed resource aggregates. Both effects together allow the uplink or northbound interface (i.e. between the access multiplexer and further network infrastructure) to have less bandwidth than the sum of the downlink or southbound interfaces (i.e. between the access multiplexer and users).

PONs and DOCSIS networks may inherently offer oversubscription on their shared media, as they do not reserve a fixed amount of upstream bandwidth per network user but perform DBA to flexibly assign upstream bandwidth based on the instantaneous need announced by the individual network users. While this does not increase the guaranteed rate for network users, it does significantly increase the maximum rate, which is the revenue-generating data rate mentioned in the network user's subscription plan.

Examples are based on the finding that network operators may adopt distributed architectures on their access networks as a means to reduce peak power consumption in a single location. Such distributed architectures for Hybrid Fiber Coax (HFC) cable networks or 5G (5th generation mobile communication system) access networks include Distributed Access Architecture (DAA) in DOCSIS or cable networks and Cloud Radio Access Network (Cloud RAN) in mobile or cellular networks. In those architectures, transport lines (i.e. fronthaul lines) connect the remote physical layer (PHY)—known as a remote PHY node (RPD) in cable networks or a remote radio head (RRH) in cellular networks—with a centralized access multiplexer deeper in the network—known as a virtual CTMS (vCMTS) in cable or a virtual baseband unit (vBBU) in cellular. Examples enable the introduction of distributed architectures for PON or optical network applications as well.

Additionally, it has been found that the adoption of a distributed architecture in an optical network creates a need to control the oversubscription between a remote PHY unit and the central part of the access multiplexer, as the network links between them are expensive resources and should not be over-dimensioned. Operating them at a lower rate than the aggregated PON rates seems natural, given the amount of multicast traffic in downstream direction, but this leads to an oversubscription of the link in upstream direction. Examples may enable to control this oversubscription while preserving the low-power and low-profile-processing idea of the remote PHY.

FIG. 1 is a schematic overview of the elements of a communications network 100 including examples of a central unit 112, a central unit apparatus 120, a remote unit 114, a remote unit apparatus 140, and an OLT 110. An apparatus may be likewise a circuit, a module, circuitry, a unit, a device, a chip, a semiconductor, or a printed circuit board with electrical components.

FIG. 1 shows an example of a central unit apparatus 120 for the OLT 110. The OLT 110 also comprises one or more remote unit apparatuses 140. The central unit apparatus 120 comprises one or more interfaces 124 configured to communicate with the one or more remote unit apparatuses 140 via one or more communication links 133. The central unit apparatus 120 also comprises a processor 122 coupled to the one or more interfaces 124. The processor is configured to control the one or more interfaces 124 to receive information on one or more upstream reports from the one or more remote unit apparatuses 140. The one or more upstream reports relate to one or more optical networks 113 used by the one or more remote unit apparatuses 140 to communicate with a plurality of optical network users 160. The processor 122 is configured to determine information on bandwidth assignments for the plurality of optical network users 160 based on the information on the one or more upstream reports. The processor 122 is further configured to transmit the information on the bandwidth assignments to the one or more remote unit apparatuses 140.

FIG. 1 also shows an example of a remote unit apparatus 140 for an OLT 110 further comprising a central unit apparatus 120. The remote unit apparatus 140 comprises one or more interfaces 144 configured to communicate with a plurality of optical network users 160 via one or more optical networks 113. The one or more interfaces 144 are further configured to communicate with the central unit apparatus 120 via a communication link 133. The remote unit apparatus 140 further comprises a processor 142 coupled to the one or more interfaces 144. The processor 142 is configured to control the one or more interfaces 144 to receive information on bandwidth desires or requests for the plurality of the optical network users 160. The processor 142 is configured to determine information on an upstream report relating to information on the bandwidth desire for the plurality of the optical network users 160. The processor 142 is configured to transmit to the central unit apparatus 120 the information on the upstream report. The processor 142 is configured to receive from the central unit apparatus 120 information on bandwidth assignments for the plurality of the optical network users 160. The processor 142 is further configured to assign transmission capacities to the plurality of the optical network users 160 of the optical network 113 based on the information on the bandwidth assignment.

FIG. 1 further illustrates an example of a central unit 112, as optional component, comprising an example of the central unit apparatus 120. Optional components are illustrated using dotted lines. Likewise, FIG. 1 also illustrates an example of a remote unit 114 comprising an example of the remote unit apparatus 140. An example of an OLT 110 comprises examples of the central unit 112 and the remote unit 114. The OLT 110 in FIG. 1 is shown with a potentially distributed architecture. The components shown in FIG. 1 further form an example of a network or system 100.

In examples the one or more interfaces 124, 144 may correspond to any means for obtaining, receiving, transmitting or providing analog or digital signals or information (e.g. any connector, contact, pin, register, input port, output port, conductor, lane, etc.), which allows providing or obtaining a signal or information. An interface may be wireless or wireline and it may be configured to communicate (i.e. transmit or receive signals) information with further internal or external components. The one or more interfaces 124, 144 may comprise further components to enable according communication in the communication network/system 100, such components may include transceiver (i.e. transmitter and/or receiver) components, such as one or more amplifiers, one or more multiplexers, one or more duplexers, one or more diplexers, one or more filters or filter circuitry, one or more converters, one or more mixers, accordingly adapted (e.g. radio) frequency components, etc. The one or more interfaces 124, 144 may serve the purpose of transmitting or receiving or both, transmitting and receiving, information, such as information, input data, control information, further information messages, etc.

As shown in FIG. 1 the respective one or more interfaces 124, 144 are coupled to the respective processors 122, 142 at the apparatuses 120, 140. In examples the processors 122, 142 may be implemented using one or more processing units, one or more control modules, one or more processing devices, any means for processing, such as a processor, a computer or a programmable hardware component being operable with accordingly adapted software. In other words, the described functions of the processors 122, 142 may as well be implemented in software, which is then executed on one or more programmable hardware components. Such hardware components may comprise a general-purpose processor, a Digital Signal Processor (DSP), a micro-controller, etc.

The optical network users may be optical network units (ONUs) or network interface devices (NIDs). For example, they may serve a demarcation point between a carrier's local loop and a customer's premises wiring. Although an ONU may connect to one or more customers, users, or subscribers, the term optical network user and ONU may be used interchangeably when discussing embodiments of access networks.

Any information as described herein may be communicated in terms of analog or digital signals. For example, there may be a control plane between network entities, which allows exchanging control messages with according information. In some examples, dedicated control channels may be defined, which provide a protocol context to exchange said control information or messages. Such information may be represented by one or more bits or digital values, which are to be interpreted in the light of the respective protocols.

Figure 2:
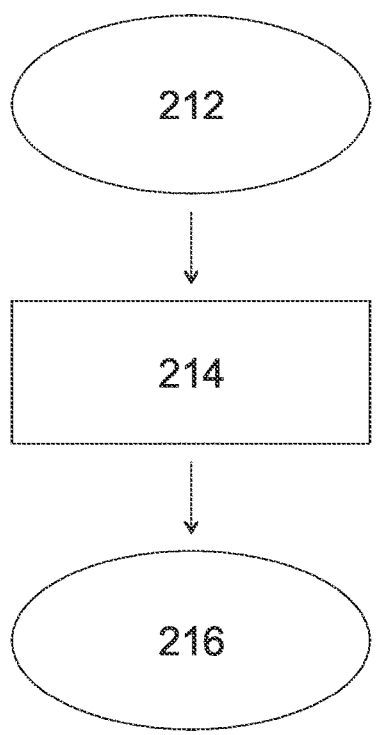
FIG. 2 shows a block diagram of an example method for a central unit apparatus.

FIG. 2 shows a block diagram of an example method 200 for a central unit apparatus 120 for an OLT 110, which also comprises one or more remote unit apparatuses 140. The method 200 comprises receiving information 212 on one or more upstream reports from the one or more remote unit apparatuses 140. The one or more upstream reports relate to one or more optical networks 113 used by the remote unit apparatus 140 to communicate with a plurality of optical network users 160. The method 200 comprises determining information 214 on bandwidth assignments for the plurality of optical network users 160 based on information on the one or more upstream reports. The method 200 further comprises transmitting the information 216 on the bandwidth assignments to the one or more remote unit apparatuses 140.

Figure 3:
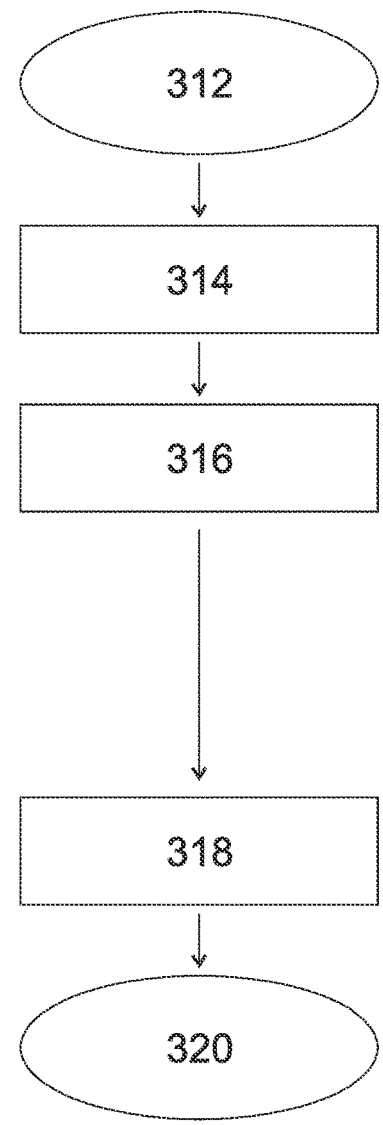
FIG. 3 shows a block diagram of an example method for a remote unit apparatus.

FIG. 3 shows a block diagram of an example method 300 for a remote unit apparatus 140 for an OLT 110 comprising a central unit apparatus 120. The method 300 comprises receiving information 312 on bandwidth desires for the plurality of the optical network users 160. The method 300 comprises determining information 314 on an upstream report relating to information on the bandwidth desire for the plurality of the optical network users 160. The method 300 comprises transmitting 316 to the central unit apparatus 120 the information on the upstream report. The method 300 comprises receiving 318 from the central unit apparatus 120 information on bandwidth assignments for the plurality of the optical network users 160. The method 300 further comprises assigning transmission capacities to the plurality of the optical network users 160 of the optical network 113 based on the information on the bandwidth assignment.

Examples may enable a layered DBA function to control oversubscription on aggregated links within a (potentially distributed) access multiplexer. The DBA ensures that an oversubscribed link is never overloaded.

Figure 4:
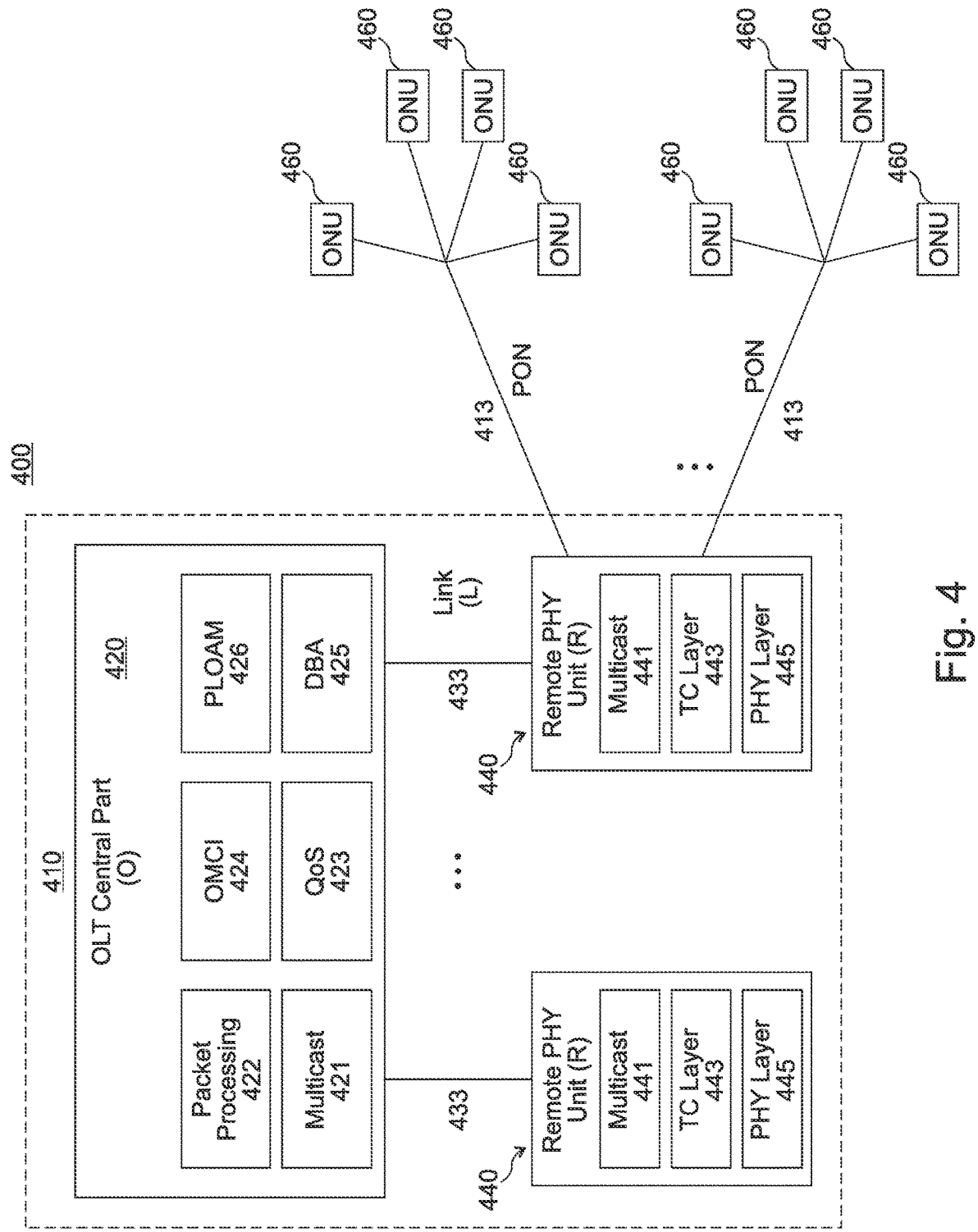
FIG. 4 shows an example of a network and protocol architecture.

FIG. 4 is a schematic overview of the elements of a PON access network 400, including an example of a distributed OLT 410. The OLT 410 is decomposed into a central unit apparatus 420, which can be a dedicated (i.e. single-purposed hardware appliance) or virtualized device (i.e. virtual network function). The plurality of remote units 440 is connected to the central unit 412 with communication links 433. In the example detailed in FIG. 4, the one or more optical networks 413 may be passive optical networks (PON) and the bandwidth assignments relate to uplink data transmission from the optical network users 460 to the remote unit apparatus 440.

FIG. 4 shows an example of a central unit apparatus 420 for the OLT 410. The OLT 410 also comprises one or more remote unit apparatuses 440. The central unit apparatus 420 comprises one or more interfaces 124 configured to communicate with the one or more remote unit apparatuses 440 via one or more communication links 433 in line with FIG. 1. The central unit apparatus 420 also comprises a processor 122 coupled to the one or more interfaces 124. The processor is configured to control the one or more interfaces 124 to receive information on one or more upstream reports from the one or more remote unit apparatuses 440. The one or more upstream reports relate to one or more PONs 413 used by the one or more remote unit apparatuses 440 to communicate with a plurality of ONUs 460. The processor 122 is configured to determine information on bandwidth assignments for the plurality of ONUs 460 based on the information on the one or more upstream reports. The processor 122 is further configured transmit the information on the bandwidth assignments to the one or more remote unit apparatuses 440.

FIG. 4 further illustrates an example of a central unit apparatus that can perform all OLT functions except the PON multicasting 441, transmission convergence (TC) layer 443, and PHY 445 layer functions. These functions are performed by the remote unit apparatus 440. OLT functions may relate to packet processing 422, a ONU management control interface (OMCI) 424, Physical Layer Operations, Administration and Maintenance (PLOAM) 426, link multicasting 421, Quality of Service (QoS) 423, and DBA 425. Link multicasting refers to replication onto all links 433 by the central unit apparatus 420, whereas PON multicasting refers to replication onto PONs 413 done by the remote unit apparatus 440. In further examples the functional split or protocol split may be different.

A practical hypothetical demonstrating the example in FIG. 4 may assume that a remote unit apparatus 440 drives 16 PONs 413 with a bandwidth of 10 Gbit/s each, resulting in an aggregated data rate of 160 Gbit/s. The communications link 433 would be a 100 Gbit/s Ethernet link. Having a communications link 433 of a lower bandwidth than the aggregated bandwidths of the PONs (i.e. oversubscription) may be done to save on the cost of the communications link 433. Instead of simply allocating 1/16 of the 100 Gbit/s for each PON 413, which would result in a permanent under-utilization of each PON 413, the oversubscribed communications link 433 is controlled by an additional layer of DBA 425.

Figure 5A:
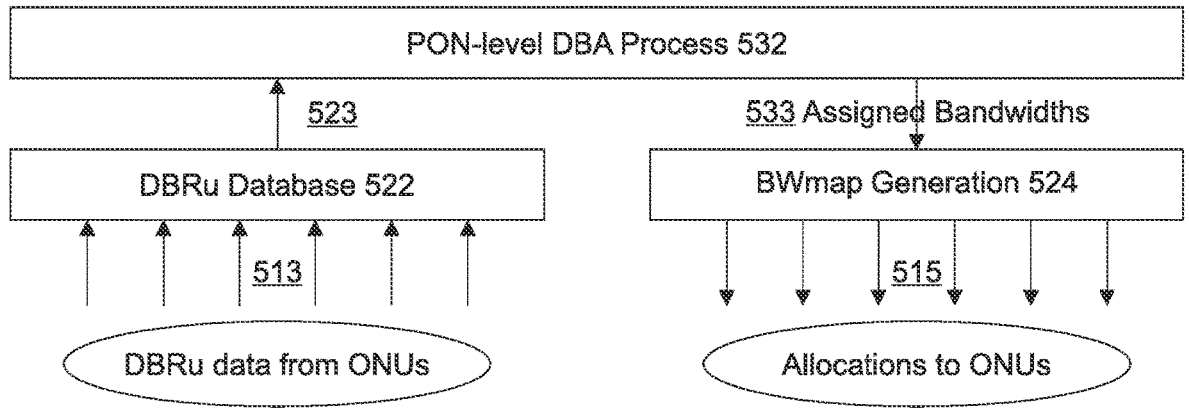
FIGS. 5A and 5B show a comparison between a commonly used DBA (FIG. 5A) and a layered DBA (FIG. 5B) in an example.
Figure 5B:
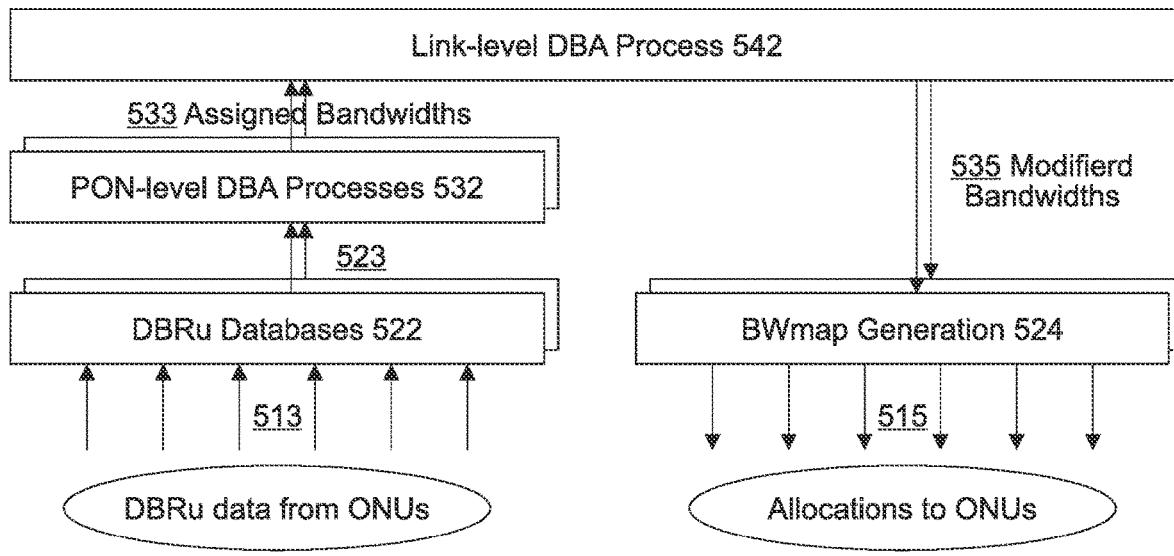

FIGS. 5A and 5B show a comparison between a usual DBA scheme 500 in FIG. 5A and a layered DBA scheme 501 in FIG. 5B. In FIG. 5A, a PON-level DBA function 532 is performed for each of the PONs separately. FIG. 5A shows, first, a collection of information or data comprising information on the current need for upstream bandwidth (i.e. bandwidth desires) for all ONUs of the PON. This is information is checked by collecting further information comprising the ONUs feedback on upstream traffic waiting for transmission. The information collected 513 is commonly called a dynamic bandwidth report upstream (DBRu). The DBRu information from ONUs are stored in a database 522. Then, a DBA process is performed at the PON-level 532 and the corresponding shares of the available upstream rate are assigned accordingly 533. Then, a usual DBA implementation would translate the upstream rates into suitable allocations of upstream transmission times, defined by start times and allocation sizes. This is known as bandwidth map (BWmap) generation. Finally, the BWmap information is transmitted to each ONU 515 where the ONU derives its own bandwidth allocation from the broadcasted BWmap.

FIG. 5B shows a layered DBA approach 501. FIG. 5B shows, first, a collection 513 of DBRu information comprising bandwidth desires for all ONUs of the PON. The DBRu information from ONUs are stored in a database 522. Then, a PON-level DBA process 532 is performed for each PON and the corresponding shares of the available upstream rate are assigned accordingly 533. A second layer aggregates the per-PON DBA processes to form a link-level DBA 542. The upstream rate assignments defined by the lower layer (PON-level) DBA processes are propagated to a higher layer (link-level) DBA process which reviews the bandwidth assignment across all the PONs aggregated on communications link 133. Its objective is to ensure that, even though the communications link 133 is oversubscribed, the rate guarantees for all subscribers 160 are satisfied and the remaining uplink bandwidth on the communications link 133 is properly shared between all PONs. The link-level DBA process 542 modifies the assigned bandwidths 535 to this effect. Only after the assigned bandwidth values have been modified accordingly 535, a bandwidth map is generated 524 for each PON. Finally, the BWmap information is transmitted to each ONU 515, where the ONU derives its own bandwidth allocation from the broadcasted BWmap.

PON access networks may generally follow the traffic class handling concepts found in the Institute of Electrical and Electronics Engineers (IEEE) and International Telecommunications Union (ITU) networking standards. Network traffic is generally divided into several classes with a plurality, often eight, priority values. Traffic will be marked with the appropriate priority value and all network devices are expected to treat the traffic accordingly.

In the ITU's Gigabit-capable PON (GPON) standard, network operators decide how to map traffic into transmission containers (T-Conts). Generally, traffic is mapped based on a combination of factors including the subscriber, traffic class, and service provider. Each T-Cont is identified by allocation identifiers (AllocIDs) assigned by the OLT to an ONU to identify the T-Cont that has received an upstream bandwidth allocation within the ONU.

In the IEEE's Ethernet PON network (EPON) standard, each ONU is uniquely identified by a logical link ID (LLID). LLIDs are then attached to the preamble of an Ethernet frame, as specified by IEEE 802.3, and traffic is transported natively on the Ethernet network.

DBA schemes for T-Conts and LLIDs have been specified by the ITU and IEEE, respectively. These specifications define the terms and principles of the DBA such that an OLT and ONU can interact successfully. However, these specifications do not identify specific algorithms, which are developed by system vendors or operators. Information provided to the DBA algorithm includes provisioned information as well as actual demand information. ONUs continuously update the OLT on the amount of data waiting for upstream transmission on each of the T-Conts or LLIDs.

For example, best effort is a default traffic class (in the absence of priority information), but it might not be handled as lowest priority. For example, background traffic with a specified priority code point (PCP; e.g. PCP=1) is handled with lowest priority.

Typically, the PON-level DBA algorithms work on the basis of two provisioned rates: An assured rate and a maximum rate. In the PON case, these rates are defined per T-Cont or LLID that either represent a subscriber or a combination of traffic class and subscriber. The assured rate is guaranteed to be available whenever it is needed (if not needed, this bandwidth does not go to waste, but can be used for other purposes). Consequently, the sum of all assured rates must be lower than the available upstream bandwidth on the PON. The maximum rate defines the upper rate limit—even if plenty of upstream bandwidth is free, the T-Cont or LLID would not be assigned more than the provisioned maximum rate. This is usually the rate mentioned in the network user's subscription plan. All bandwidth that is momentarily not used to satisfy assured rates is distributed between T-Conts, within the limits of their maximum rates, based on how much data they have to transmit, business priorities, and contractual obligations.

In GPONs, DBAs algorithms generally first determine, calculate, or assign the bandwidth of all the T-Conts with fixed bandwidth allocations. Then assigning assured bandwidth for each T-Cont with variable allocations. Finally, DBAs assign the remaining bandwidth to T-Conts with variable allocations based on priority or weight factors. These factors also take into account any maximum bandwidth limits. The assignments are then translated into a sequence of allocations, known as T-Cont grants. These can be frequent small allocations or rare large allocations, depending on each T-Cont's configured delay tolerance value. This sequence of allocations is valid until a new bandwidth assignment calculation is ready.

EPONs follow a different approach. EPONs cannot fragment Ethernet frames, so bandwidth efficiency requires the OLT to know the sizes of upstream frames waiting for transmission. The ONU reports a couple of options for good grant sizes (e.g. just a few frames, more frames, all frames, etc.) and the DBA algorithm picks a suitable value and grants an allocation of exactly that size.

The layered DBA approach in examples may extend the regular PON-level DBA to control the bandwidth usage on the link which connects the remote unit apparatus 140, 440 to the central unit apparatus 120, 420 of the OLT 110, 410. This results in an additional bandwidth provisioning condition. In the layered DBA, the sum of all assured rates may be no larger than the capacity of communications link 133. The remaining process of fairly distributing bandwidth stays the same, but is executed on a wider scope, since it now needs to cover all PONs 113 connected via communications link 133.

Note that the term "layered DBA" does not imply a layered implementation—it may be implemented as a one-step process covering both the PON-layer DBA and the link-layer DBA aspects. It may also be implemented in a two-step process across the OLT 110 where the first step the lower layer (PON-level) DBA algorithm is performed at the remote unit before the remote unit reports the upstream rate assignments to the central unit where the link-layer (i.e. higher level, uplink level) DBA process is performed across all the PONs aggregated on communications link 133, 433.

FIGS. 1 and 4 show examples of central unit apparatuses 120, 420 and remote unit apparatuses 140, 440 for the OLT 110, 410 that can determine DBAs. Different principles are conceivable in different examples. In some examples, the processing can be done at the central unit apparatus 120. The information on the upstream reports may then comprise information on a bandwidth desire for the plurality of the optical network users 160. The processor 142 at the remote unit apparatus 140 is then configured to determine the information on an upstream report such that it comprises information on the bandwidth desires for the plurality of the optical network users 160. Additionally, information on a transmission capacity of the one or more optical networks 113, 413 may be comprised in the upstream reports. The processor 122 at the central unit apparatus 120 is then configured to determine information on bandwidth assignments for the plurality of optical network users 160 based on the information on the one or more upstream reports.

In examples multiple implementations of the bandwidth assignment determination at the central unit apparatus 120 are conceivable. For example, the bandwidth assignment can be determined in two steps. This determination (e.g. DBA) can be made through first, a preliminary evaluation based on information including the bandwidth desire for the plurality of the optical network users 160 and a transmission capacity of the one or more optical networks 113. Then a subsequent evaluation can be carried out based on information including the preliminary evaluation and a transmission capacity of the one or more communication links 133.

In another example, the determination could also be made through a single evaluation based on information including the bandwidth desire for the plurality of the optical network users 160, a transmission capacity of the one or more optical networks 113, and a transmission capacity of the one or more communication links 133.

It is noted that in example, transmission capacities may be predefined or pre-known. The communication links, be it the one between the central and remote unit apparatuses 120, 420, 140, 440 or the one of the optical networks 113 or both, are rather static. Therefore, information on their capacities may be configured or communicated once and then be re-used in the according methods.

In further examples, a preliminary assignment (e.g. the above first evaluation) may be carried out at the remote unit apparatus 140, 440. The processor 142 of the remote unit apparatus 140, 440 is then configured to evaluate the information on the bandwidth desires of the plurality of optical network users 160 to obtain potential bandwidth assignments for the plurality of the optical network users 160. The information on the upstream report then comprises information on the potential bandwidth assignments.

From the perspective of the central unit apparatus 120, 420 the information on the upstream report also comprises information on the preliminary bandwidth assignments determined by the one or more remote unit apparatuses 140, 440. Then processor 122 could also determine information on bandwidth assignments for the plurality of optical network users 160 based on the information on the information on the preliminary bandwidth assignment and a transmission capacity of the of the one or more communication links 133.

As described above, the processor 142 is configured to receive from the central unit apparatus 120, 420 information on bandwidth assignments for the plurality of the optical network users 160. The processor 142 is further configured to assign transmission capacities to the plurality of the optical network users 160 of the optical network 113 based on the information on the bandwidth assignments. The apparatuses and methods of FIGS. 1-5 may be implemented in a non-transitory machine readable computer program executed on a computer, processor, or a programmable hardware component.

The aspects and features mentioned and described together with one or more of the previously detailed examples and figures, may as well be combined with one or more of the other examples in order to replace a like feature of the other example or in order to additionally introduce the feature to the other example.

Some examples may be summarized as follows:

Example 1 is a central unit apparatus (120; 420) for an optical line terminal (110; 410), the optical line terminal (110; 410) further comprising one or more remote unit apparatuses (140; 440), the central unit apparatus (120; 420) comprises one or more interfaces (124) configured to communicate with the one or more remote unit apparatuses (140; 440) via one or more communication links, and a processor (122) configured to receive information on one or more upstream reports from the one or more remote unit apparatuses (140; 440), the one or more upstream reports relate to one or more optical networks (113; 413) used by the one or more remote unit apparatuses (140; 440) to communicate with a plurality of optical network users (160; 460); determine the information on bandwidth assignments for the plurality of optical network users (160; 460) based on information on the one or more upstream reports; and transmit the information on the bandwidth assignments to the one or more remote unit apparatuses (140; 440).

Example 2 is the central unit apparatus (120; 420) of example 1, wherein the information on the upstream reports comprises information on a bandwidth desire for the plurality of the optical network users (160; 460).

Example 3 is the central unit apparatus (120; 420) of example 2, wherein the information on bandwidth assignments for the plurality of the optical network users (160; 460) is determined by a preliminary evaluation based on information including the bandwidth desire for the plurality of the optical network users (160; 460); and a transmission capacity of the one or more optical networks (113; 413), and a subsequent evaluation based on information including the preliminary evaluation and a transmission capacity of the one or more communication links.

Example 4 is the central unit apparatus (120; 420) of example 2, wherein the information on bandwidth assignments for the plurality of the optical network users (160; 460) is based on information including the bandwidth desire for the plurality of the optical network users (160; 460); a transmission capacity of the one or more optical networks (113; 413); and a transmission capacity of the one or more communication links.

Example 5 is the central unit apparatus (120; 420) of example 1, wherein the information on the upstream report comprises information on preliminary bandwidth assignments determined by the one or more remote unit apparatuses (140; 440), and wherein the bandwidth assignments for the plurality of the optical network users (160; 460) are based on the preliminary bandwidth assignment and a transmission capacity of the of the one or more communication links.

Example 6 is the central unit apparatus (120; 420) of examples 1 to 5, wherein the one or more optical networks (113, 413) are passive optical networks.

Example 7 is the central unit apparatus (120; 420) of one of the examples 1 to 6, wherein the bandwidth assignments relate to uplink data transmission from the optical network users (160; 460) to the remote unit apparatus (140; 440).

Example 8 is a remote unit apparatus (140; 440) for an optical line terminal (110; 410), the optical line terminal (110; 410) further comprising a central unit apparatus (120; 420), the remote unit apparatus (140; 440) comprising one or more interfaces (144) configured to communicate with a plurality of optical network users (160; 460) via one or more optical networks (113); and communicate with the central unit apparatus (120; 420) via a communication link, a processor (142) configured to receive information on bandwidth desires for the plurality of the optical network users (160; 460), determine information on an upstream report relating to information on the bandwidth desire for the plurality of the optical network users (160; 460), transmit to the central unit apparatus (120; 420) the information on the upstream report; receive from the central unit apparatus (120; 420) information on bandwidth assignments for the plurality of the optical network users (160; 420); and assign transmission capacities to the plurality of the optical network users (160; 460) of the optical network based on the information on the bandwidth assignment.

Example 9 is the remote unit apparatus (140; 440) of example 8, wherein the information on the upstream report comprises information on the bandwidth desires for the plurality of the optical network users (160; 460).

Example 10 is the remote unit apparatus (140; 440) of example 8 to 9, wherein the information on the upstream report comprises the information on a transmission capacity of the one or more optical networks (113; 413).

Example 11 is the remote unit apparatus (140; 440) of example 8 to 10, wherein the processor (122) is configured to evaluate the information on the bandwidth desires of the plurality of optical network users (160; 460) to obtain potential bandwidth assignments for the plurality of the optical network users (160; 460), wherein the information on the upstream report comprises information on the potential bandwidth assignments.

Example 12 is the remote unit apparatus (140; 440) of example 8 to 11, wherein the optical network (113; 413) is a passive optical network.

Example 13 is an optical line terminal (110) comprising a central unit apparatus (120) according to one of the examples 1 to 7 and a remote unit apparatus (140) according to one of the examples 8 to 12.

Example 14 is a method (200) for a central unit apparatus (120; 420) for an optical line terminal (110; 410), the optical line terminal (110; 410) further comprising one or more remote unit apparatuses (140; 440), the central unit method (200) comprising receiving information (212) on one or more upstream reports from the one or more remote unit apparatuses (140; 440), the one or more upstream reports relate to one or more optical networks (113; 413) used by the remote unit apparatus (140; 440) to communicate with a plurality of optical network users (160; 460); determining the information (214) on bandwidth assignments for the plurality of the optical network users (160; 460) based on information on the one or more upstream reports; and transmitting the information (216) on the bandwidth assignments to the one or more remote unit apparatuses (140; 440).

Example 15 is a method (300) for a remote unit apparatus (140; 440) for an optical line terminal (110; 410), the optical line terminal (110; 410) further comprising a central unit apparatus (120; 420), the remote unit method (300) comprising receiving information (312) on bandwidth desires for the plurality of the optical network users (160; 460); determining information (314) on an upstream report relating to information on the bandwidth desire for the plurality of the optical network users (160; 460); transmitting (316) to the central unit apparatus (120; 420) the information on the upstream report; receiving (318) from the central unit apparatus (120; 420) information on bandwidth assignments for the plurality of the optical network users (160; 460); and assigning (320) transmission capacities to the plurality of the optical network users (160; 460) of the optical network (113; 413) based on the information on the bandwidth assignment.

Example 16 is a non-transitory machine-readable computer program comprising instructions to perform at least one of the methods (200; 300) of examples 14 to 15 executed on a computer, processor, or a programmable hardware component.

Example 17 is a computer program having a program code for performing at least one of the methods (200; 300) according to any of the examples described herein, when the computer program is executed on a computer, a processor, or a programmable hardware component.

Example 18 is a machine-readable storage including machine readable instructions, when executed, to implement at least one method (200; 300) described herein, or realize an apparatus being configured to implement at least one method described herein.

Example 19 is a machine-readable medium including code, when executed, to cause a machine to perform at least one method (200; 300) described herein.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A central unit apparatus for an optical line terminal, the optical line terminal further comprising one or more remote unit apparatuses, the central unit apparatus comprising:
   one or more interfaces configured to communicate with the one or more remote unit apparatuses via one or more communication links, and
   a processor configured to
      receive information on one or more upstream reports from the one or more remote unit apparatuses,
         wherein the one or more upstream reports relate to one or more optical networks used by the one or more remote unit apparatuses to communicate with a plurality of optical network users,
         wherein the information on the upstream reports comprises information on a bandwidth desire for the plurality of the optical network users;
      determine information on bandwidth assignments for the plurality of optical network users based on
         a preliminary evaluation based on information including
            the bandwidth desire for the plurality of the optical network users; and
            a transmission capacity of the one or more optical networks, and
         a subsequent evaluation based on information including the preliminary evaluation and a transmission capacity of the one or more communication links; and
      transmit the information on the bandwidth assignments to the one or more remote unit apparatuses.

2. The central unit apparatus of claim 1, wherein the determination of the information on bandwidth assignments for the plurality of the optical network users further includes.

3. The central unit apparatus of claim 1,
   wherein the information on the upstream reports comprises information on potential bandwidth assignments determined by the one or more remote unit apparatuses.

4. The central unit apparatus of claim 1, wherein the one or more optical networks are passive optical networks.

5. The central unit apparatus of claim 1, wherein the information on bandwidth assignments relate to information on uplink data transmission from the optical network users to the remote unit apparatus.

6. An optical line terminal comprising the central unit apparatus according to claim 1 and one or more remote unit apparatuses, the remote unit apparatus comprising:
   one or more interfaces configured to:
      communicate with a plurality of optical network users via one or more optical networks; and
      communicate with the central unit apparatus via a communication link, and
   a processor configured to
      receive information on bandwidth desires for the plurality of the optical network users,
      determine information on an upstream report relating to information on the bandwidth desires for the plurality of the optical network users,
      transmit the information on the upstream report to the central unit apparatus;
      receive information on bandwidth assignments for the plurality of the optical network users from the central unit apparatus; and
      assign transmission capacities based on the information on the bandwidth assignments to the plurality of the optical network users via the optical network.

7. A remote unit apparatus for an optical line terminal, the optical line terminal further comprising a central unit apparatus, the remote unit apparatus comprising:
   one or more interfaces configured to:
      communicate with a plurality of optical network users via one or more optical networks; and
      communicate with the central unit apparatus via a communication link, and
   a processor configured to
      receive information on bandwidth desires for the plurality of the optical network users;

evaluate the information on the bandwidth desires of the plurality of optical network users to obtain potential bandwidth assignments for the plurality of the optical network users;

determine information on an upstream report relating to information on the bandwidth desires for the plurality of the optical network users, wherein the information on the upstream report comprises information on the potential bandwidth assignments;

transmit the information on the upstream report to the central unit apparatus;

receive information on bandwidth assignments for the plurality of the optical network users from the central unit apparatus; and assign transmission capacities based on the information on the bandwidth assignments to the plurality of the optical network users via the optical network.

8. The remote unit apparatus of claim 7, wherein the information on the upstream report comprises information on the bandwidth desires for the plurality of the optical network users.

9. The remote unit apparatus of claim 7, wherein the information on the upstream report comprises the information on a transmission capacity of the one or more optical networks.

10. The remote unit apparatus of claim 7, wherein the evaluation to obtain potential bandwidth assignments for the plurality of the optical network users includes a transmission capacity of the one or more optical networks.

11. The remote unit apparatus of claim 7, wherein the optical network is a passive optical network.

12. A method for a central unit apparatus for an optical line terminal, the optical line terminal further comprising one or more remote unit apparatuses, the central unit method comprising:

receiving information on one or more upstream reports from the one or more remote unit apparatuses,
wherein the one or more upstream reports relate to one or more optical networks used by the remote unit apparatus to communicate with a plurality of optical network users,
wherein the information on the upstream reports comprises information on a bandwidth desire for the plurality of the optical network users;

determining the information on bandwidth assignments for the plurality of optical network users based on
a preliminary evaluation based on information including
the bandwidth desire for the plurality of the optical network users; and
a transmission capacity of the one or more optical networks, and
a subsequent evaluation based on information including the preliminary evaluation and a transmission capacity of the one or more communication links; and transmitting the information on bandwidth assignments to the one or more remote unit apparatuses.

13. A non-transitory machine readable computer program comprising instructions to perform the method of claim 12 executed on a computer, processor, or a programmable hardware component.

14. A method for a remote unit apparatus for an optical line terminal, the optical line terminal further comprising a central unit apparatus, the remote unit method comprising:

receiving information on bandwidth desires for the plurality of the optical network users;

evaluating the information on the bandwidth desires of the plurality of optical network users to obtain potential bandwidth assignments for the plurality of the optical network users, determining information on an upstream report relating to information on the bandwidth desire for the plurality of the optical network users, wherein the information on the upstream report comprises information on the potential bandwidth assignments;

transmitting the information on the upstream report to the central unit apparatus;

receiving information on bandwidth assignments for the plurality of the optical network users from the central unit apparatus; and assigning transmission capacities based on the information on bandwidth assignments to the plurality of the optical network users via the optical network.

15. A non-transitory machine readable computer program comprising instructions to perform the method of claim 14 executed on a computer, processor, or a programmable hardware component.

* * * * *